(12) United States Patent
Tanaka et al.

(10) Patent No.: US 9,475,036 B2
(45) Date of Patent: Oct. 25, 2016

(54) HYDROGENATION REFINING CATALYST AND METHOD FOR PRODUCING A HYDROCARBON OIL

(75) Inventors: Yuichi Tanaka, Tokyo (JP); Takuya Niitsuma, Tokyo (JP); Kazuhiko Tasaka, Tokyo (JP); Marie Iwama, Tokyo (JP)

(73) Assignees: JAPAN OIL, GAS AND METALS NATIONAL CORPORATION, Tokyo (JP); INPEX CORPORATION, Tokyo (JP); JX NIPPON OIL & ENERGY CORPORATION, Tokyo (JP); JAPAN PETROLEUM EXPLORATION CO., LTD., Tokyo (JP); COSMO OIL CO., LTD., Tokyo (JP); NIPPON STEEL & SUMIKIN ENGINEERING CO., LTD., Tokyo (JP)

( * ) Notice: Subject to any disclaimer, the term of this patent is extended or adjusted under 35 U.S.C. 154(b) by 277 days.

(21) Appl. No.: 14/008,246

(22) PCT Filed: Mar. 26, 2012

(86) PCT No.: PCT/JP2012/057764
§ 371 (c)(1),
(2), (4) Date: Dec. 31, 2013

(87) PCT Pub. No.: WO2012/133316
PCT Pub. Date: Oct. 4, 2012

(65) Prior Publication Data
US 2014/0326642 A1    Nov. 6, 2014

(30) Foreign Application Priority Data
Mar. 31, 2011    (JP) .................................. 2011-080572

(51) Int. Cl.
*C10G 45/64* (2006.01)
*B01J 23/42* (2006.01)
(Continued)

(52) U.S. Cl.
CPC ............... *B01J 23/42* (2013.01); *B01J 21/066* (2013.01); *B01J 21/12* (2013.01); *B01J 21/18* (2013.01);
(Continued)

(58) Field of Classification Search
CPC ....... B01J 38/02; B01J 37/0009; B01J 37/08
See application file for complete search history.

(56) References Cited

U.S. PATENT DOCUMENTS 3,344,059 A    9/1967   Engebretson
4,174,301 A    11/1979  Choca et al.
(Continued)

FOREIGN PATENT DOCUMENTS

CA         882679      10/1971
CN      1298925 A  *   6/2001
(Continued)

OTHER PUBLICATIONS

Translation of the International Preliminary Report on Patentability for International Application No. PCT/JP2012/057764, mailed on Oct. 17, 2013.
(Continued)

*Primary Examiner* — Randy Boyer
*Assistant Examiner* — Juan Valencia
(74) *Attorney, Agent, or Firm* — Greenblum & Bernstein, P.L.C.

(57) ABSTRACT

The hydrotreating catalyst of the present invention is a hydrotreating catalyst including a catalyst support including an amorphous composite metal oxide having solid acidity, and at least one active metal supported by the catalyst support and selected from noble metals of Group 8 to Group 10 in the periodic table, wherein the hydrotreating catalyst contains a carbonaceous substance including a carbon atom, and the content of the carbonaceous substance in the hydrotreating catalyst is 0.05 to 1% by mass in terms of the carbon atom.

8 Claims, 1 Drawing Sheet

(51) Int. Cl.

| | | |
|---|---|---|
| *C10G 45/62* | (2006.01) | |
| *C10G 45/60* | (2006.01) | |
| *C10G 45/70* | (2006.01) | |
| *C10G 11/18* | (2006.01) | |
| *B01J 37/08* | (2006.01) | |
| *B01J 21/06* | (2006.01) | |
| *B01J 21/12* | (2006.01) | |
| *B01J 21/18* | (2006.01) | |
| *B01J 37/00* | (2006.01) | |
| *B01J 37/02* | (2006.01) | |

(52) U.S. Cl.
CPC ......... *B01J 37/0018* (2013.01); *B01J 37/0201* (2013.01); *B01J 37/084* (2013.01); *B01J 37/088* (2013.01); *C10G 11/18* (2013.01); *C10G 45/60* (2013.01); *C10G 45/62* (2013.01); *C10G 45/64* (2013.01); *C10G 45/70* (2013.01); *C10G 2300/1048* (2013.01); *C10G 2300/301* (2013.01); *C10G 2400/30* (2013.01)

(56) References Cited

U.S. PATENT DOCUMENTS

| | | |
|---|---|---|
| 5,200,381 A | 4/1993 | Kamo |
| 5,468,709 A | 11/1995 | Yamaguchi et al. |
| 6,398,950 B1 | 6/2002 | Iwamoto et al. |
| 7,347,931 B2 * | 3/2008 | Uzio .................. B01J 37/0203 208/213 |
| 2004/0226863 A1 | 11/2004 | Uzio et al. |
| 2005/0148456 A1 | 7/2005 | Dufresne et al. |
| 2009/0258780 A1 | 10/2009 | Toba et al. |
| 2010/0300933 A1 * | 12/2010 | Tanaka .................. C10G 45/58 208/62 |
| 2014/0076782 A1 | 3/2014 | Tanaka et al. |
| 2014/0083907 A1 | 3/2014 | Tanaka et al. |
| 2014/0124411 A1 | 5/2014 | Tanaka et al. |

FOREIGN PATENT DOCUMENTS

| | | |
|---|---|---|
| CN | 1657597 | 8/2005 |
| EP | 0 325 438 | 7/1989 |
| EP | 0 532 117 | 3/1993 |
| EP | 0 541 994 | 5/1993 |
| JP | 54-038289 | 3/1979 |
| JP | 04-156949 | 5/1992 |
| JP | 05-192571 | 8/1993 |
| JP | 06-226108 | 8/1994 |
| JP | 2003-284958 | 10/2003 |
| JP | 2004-230383 | 8/2004 |
| JP | 2004-323626 | 11/2004 |
| JP | 2006-000726 | 1/2006 |
| JP | 2007-269901 | 10/2007 |
| JP | 2008-169355 | 7/2008 |
| WO | 2004/018097 | 3/2004 |
| WO | 2006/093170 | 9/2006 |
| WO | 2011/004690 | 1/2011 |
| WO | 2012/133317 | 10/2012 |
| WO | 2012/133318 | 10/2012 |
| WO | 2012/133319 | 10/2012 |

OTHER PUBLICATIONS

International Search Report for International Application No. PCT/JP2012/057764, mailed on Jun. 19, 2012.
Office Action for CN Patent Application No. 201280015491.6 which is dated Aug. 21, 2014.
Extended European Search Report issued with respect to EP Patent Application No. 12764926.7, dated Aug. 13, 2014.

* cited by examiner

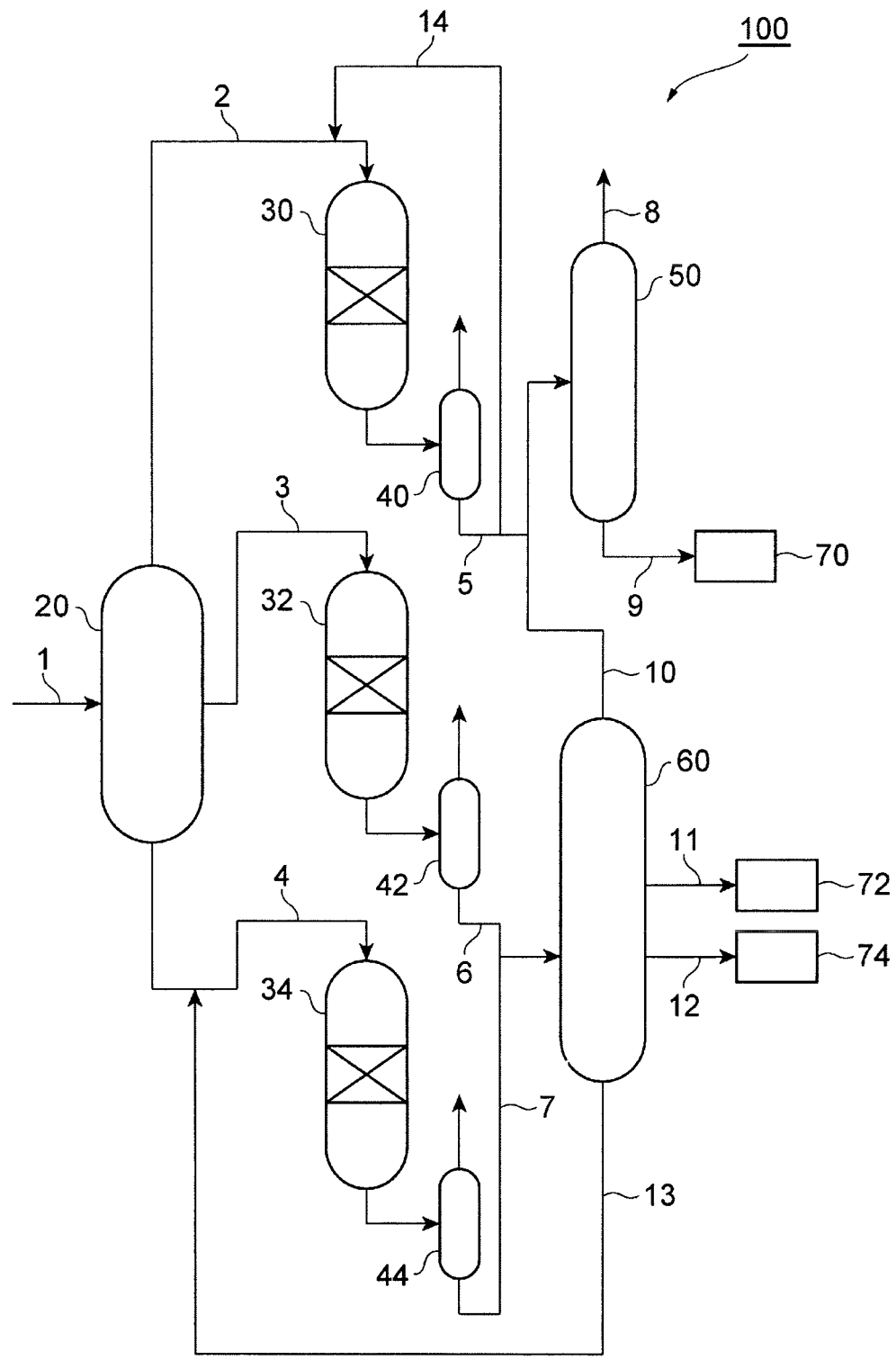

HYDROGENATION REFINING CATALYST AND METHOD FOR PRODUCING A HYDROCARBON OIL

TECHNICAL FIELD

The present invention relates to a hydrotreating catalyst and a process for producing a hydrocarbon oil using the hydrotreating catalyst.

BACKGROUND ART

Recently, from the viewpoint of increase in environmental consciousness, liquid fuels in which the contents of environmental load substances such as sulfur and aromatic hydrocarbons are small have been demanded. From such a viewpoint, as a technique which can produce a base stock for fuel oil that substantially contains neither sulfur nor aromatic hydrocarbons and is rich in aliphatic hydrocarbons, particularly, a base stock for kerosene and gas oil, a technique that has been attracting attention is one in which synthesis gas (mixed gas containing carbon monoxide gas and hydrogen gas as main components) is produced from a hydrocarbon source such as natural gas by a reforming reaction, hydrocarbons are synthesized from this synthesis gas by a Fischer-Tropsch synthesis reaction (hereinafter, also referred to as the "FT synthesis reaction"), and the hydrocarbons are further refined by hydroprocessing and fractionating to thereby obtain a base stock for fuel oil (see Patent Literature 1, for example). This technique is called GTL (Gas To Liquids) process.

A synthetic oil obtained from synthesis gas by the FT synthesis reaction (hereinafter, also referred to as the "FT synthetic oil") is a mixture containing aliphatic hydrocarbons with a wide carbon number distribution as a main component. A naphtha fraction, a middle distillate fraction, and a wax fraction can be obtained by fractionating this FT synthetic oil according to boiling points. Among the respective fractions, the middle distillate is the most useful fraction corresponding to a base stock for kerosene and gas oil and is desired to be obtained with a high yield.

Meanwhile, in the FT synthesis reaction, in addition to saturated aliphatic hydrocarbons that are main products, olefins and oxygen-containing compounds such as alcohols containing an oxygen atom derived from carbon monoxide are produced as by-products, and these by-products (impurities) are contained in large amounts in the naphtha fraction or the middle distillate obtained by fractionating the FT synthetic oil. In the case of using hydrocarbons containing these impurities as fuels, there is the possibility that constituent materials of engines may suffer damage, and therefore, it is necessary to remove these impurities. This removal of the impurities can be performed by hydrotreating the hydrocarbon oils such as the naphtha fraction and the middle distillate containing the impurities in an upgrading step of refining the FT synthetic oil by the GTL process.

In addition, since the hydrocarbons produced by the FT synthesis reaction are basically straight-chain aliphatic hydrocarbons and the straight-chain aliphatic hydrocarbons are highly crystalline, a fuel oil containing these in large amounts loses cold flow property (fluidity in a low temperature). Therefore, for the middle distillate that serves as a base stock for kerosene and gas oil, it is necessary to convert the straight-chain aliphatic hydrocarbons to branched-chain hydrocarbons by hydro-isomerization, thereby modifying cold flow property. This hydro-isomerization is generally performed simultaneously with the hydrotreating.

In the hydrotreating step of performing hydrotreating accompanied by the hydro-isomerization of the middle distillate, a hydrotreating catalyst is used in which an active metal that is selected from noble metals of Group 8 to Group 10 in the periodic table and has a hydrogenation activity is supported by a catalyst support having solid acidity such as zeolite and/or an amorphous composite metal oxide (see Patent Literatures 2 and 3, for example).

The hydrotreating catalyst used in the hydrotreating step for the middle distillate has, in addition to an activity for the above-described hydrotreating and hydro-isomerization, also an inevitable activity for a cracking reaction (hydrocracking reaction), that is, a reaction that cleaves carbon-carbon bonds in hydrocarbons to reduce the molecular weights. Therefore, when the middle distillate is subjected to the hydrotreating step, a light fraction having a boiling point lower than the boiling point range of the middle distillate is partially produced. Since the production of this light fraction leads to reduction in the yield of the middle distillate, it is preferable to suppress it.

CITATION LIST

Patent Literature

[Patent Literature 1] Japanese Patent Application Laid-Open Publication No. 2004-323626
[Patent Literature 2] Japanese Patent Application Laid-Open Publication No. 2008-169355
[Patent Literature 3] Japanese Patent Application Laid-Open Publication No. 2007-269901

SUMMARY OF INVENTION

Technical Problem

However, if an activity for a cracking reaction is suppressed by a method of, for example, weakening solid acidity possessed by a catalyst support in a hydrotreating catalyst, there was a problem that a hydro-isomerization activity is also reduced simultaneously therewith, and the cold flow property of the resulting middle distillate as a fuel oil is not sufficiently improved although the yield of the middle distillate is improved. Sufficient studies have not been made yet on a method for enhancing the hydro-isomerization activity of the hydrotreating catalyst and suppressing its cracking activity.

The present invention has been made in consideration of such circumstances, and an object of the present invention is to provide a hydrotreating catalyst that has a high hydro-isomerization activity and a suppressed cracking activity and is capable of obtaining a middle distillate excellent in cold flow property with a high yield, and a process for producing a hydrocarbon oil using the hydrotreating catalyst.

Solution to Problem

As a result of conducting diligent studies in order to solve the problem above, the present inventors have found that a particular hydrotreating catalyst containing an organic compound-derived carbonaceous substance in a particular amount sufficiently has a hydro-isomerization activity for straight-chain aliphatic hydrocarbons with its cracking activity suppressed, and can enhance the yield of a middle distillate excellent in cold flow property, particularly, a gas oil fraction, and have completed the present invention based on this finding.

Specifically, the present invention provides a hydrotreating catalyst comprising a catalyst support comprising an amorphous composite metal oxide having solid acidity, and at least one active metal supported by the catalyst support and selected from noble metals of Group 8 to Group 10 in the periodic table, wherein the hydrotreating catalyst contains a carbonaceous substance comprising a carbon atom, and the content of the carbonaceous substance in the hydrotreating catalyst is 0.05 to 1% by mass in terms of the carbon atom.

According to the hydrotreating catalyst of the present invention having the configuration above, a middle distillate rich in branched-chain aliphatic hydrocarbons and excellent in cold flow property can be obtained with a high yield by hydrotreating a raw oil in which a middle distillate rich in straight-chain aliphatic hydrocarbons is contained.

Preferably, in the hydrotreating catalyst of the present invention, the amorphous composite metal oxide is at least one selected from silica zirconia, silica alumina, and alumina boria. In the case of using this hydrotreating catalyst in the hydrotreating of a raw oil comprising a middle distillate rich in straight-chain aliphatic hydrocarbons, a middle distillate rich in branched-chain aliphatic hydrocarbons and excellent in cold flow property can be obtained with a higher yield.

In addition, preferably, in the hydrotreating catalyst of the present invention, the noble metal is platinum. In the case of using this hydrotreating catalyst, a middle distillate rich in branched-chain aliphatic hydrocarbons and more excellent in cold flow property can be obtained.

The present invention also provides a process for producing a hydrocarbon oil, comprising contacting a raw oil comprising 80% by mass or more of straight-chain aliphatic hydrocarbons with a boiling point of 25 to 360° C. and comprising 20% by mass or more of straight-chain aliphatic hydrocarbons with a boiling point of 150 to 360° C., with the above-described hydrotreating catalyst of the present invention in the presence of molecular hydrogen.

According to the process for producing a hydrocarbon oil of the present invention, a middle distillate rich in branched-chain aliphatic hydrocarbons and excellent in cold flow property can be obtained with a high yield from the above-described raw oil by using the hydrotreating catalyst of the present invention.

Preferably, in the process for producing a hydrocarbon oil of the present invention, the above-described raw oil is a synthetic oil obtained by a Fischer-Tropsch synthesis reaction. By using the synthetic oil obtained by a Fischer-Tropsch synthesis reaction as the raw oil, a middle distillate that contains neither sulfur nor aromatic hydrocarbons, is rich in branched-chain aliphatic hydrocarbons, and is excellent in cold flow property can be obtained with a high yield.

Advantageous Effects of Invention

According to the present invention, a hydrotreating catalyst that has a high hydro-isomerization activity and a suppressed cracking activity and is capable of obtaining a middle distillate excellent in cold flow property with a high yield, and a process for producing a hydrocarbon oil using the hydrotreating catalyst can be provided. A middle distillate rich in branched-chain aliphatic hydrocarbons and excellent in cold flow property with a high yield from a raw oil rich in straight-chain aliphatic hydrocarbons can thereby be obtained.

BRIEF DESCRIPTION OF DRAWINGS

FIG. 1 is a schematic configuration view showing an apparatus for producing a hydrocarbon oil in which one embodiment of a process for producing a hydrocarbon oil of the present invention is carried out.

DESCRIPTION OF EMBODIMENTS

First, a preferable embodiment of a hydrotreating catalyst of the present invention will be described. The hydrotreating catalyst of the present embodiment is a hydrotreating catalyst comprising a catalyst support comprising an amorphous composite metal oxide having solid acidity, and at least one active metal supported by the catalyst support and selected from noble metals of Group 8 to Group 10 in the periodic table, wherein the hydrotreating catalyst contains a carbonaceous substance comprising a carbon atom, and the content of the carbonaceous substance in the hydrotreating catalyst is 0.05 to 1% by mass in terms of the carbon atom. This content of the carbonaceous substance in the hydrotreating catalyst is a value based on the entire mass of the catalyst.

Examples of the amorphous composite metal oxide having solid acidity contained in the catalyst support that constitutes the hydrotreating catalyst of the present embodiment include composite metal oxides comprising a combination of 2 or 3 or more selected from metal oxide units such as alumina, silica, titania, zirconia, boria, and magnesia.

Specific examples of the amorphous composite metal oxide having solid acidity include silica alumina, silica zirconia, alumina boria, alumina zirconia, silica titania, and silica magnesia. Among these, silica alumina, silica zirconia, and alumina boria are preferable, and silica zirconia is more preferable.

The catalyst support may contain a small amount of zeolite. In this case, examples of preferable zeolite include ultra stable Y (USY)-type zeolite, Y-type zeolite, mordenite, and beta zeolite. In this case, the content of the zeolite is not particularly limited, but 0.5 to 10% by mass is preferable, and 1 to 5% by mass is more preferable, based on the entire mass of the catalyst support.

In order to enhance the moldability and mechanical strength of the catalyst support, a binder may be compounded in the catalyst support. Examples of a preferable binder include alumina, silica, and magnesia. In the case of compounding the binder in the catalyst support, the amount thereof to be compounded is not particularly limited, but it is 20 to 98% by mass, and preferably 30 to 96% by mass based on the entire mass of the catalyst support.

The catalyst support is preferably one that has been molded. Examples of the shape of the molded catalyst support include, but not particularly limited to, a sphere, a cylinder, an irregular cylinder having a trilobes or quadrolobes and a disc. A method for molding the catalyst support is not limited, and a known method such as extrusion molding or compression molding is used. The molded catalyst support is usually calcined.

The active metal supported by the catalyst support in the hydrotreating catalyst of the present embodiment is at least one selected from noble metals of Group 8 to Group 10 in the periodic table. Specific examples of the active metal are ruthenium and osmium as noble metals of Group 8, rhodium and iridium as noble metals of Group 9, and palladium and platinum as noble metals of Group 10. Among these, platinum and palladium are preferable, and platinum is more preferable. In addition, a combination of platinum-palladium is also preferably used. Here, the periodic table means the long form of the periodic table of the elements based on the specification of IUPAC (International Union of Pure and Applied Chemistry).

As the content of the active metal supported by the catalyst support in the hydrotreating catalyst of the present embodiment, 0.1 to 3% by mass in terms of the metal atom based on the mass of the catalyst support is preferable. In the case where the content of the active metal is less than the lower limit value, hydrotreating and hydro-isomerization tend not to sufficiently proceed. On the other hand, in the case where the content of the active metal is more than the upper limit value, dispersion of the active metal tends to be reduced to reduce the activity of the catalyst, and cost of the catalyst is increased.

The hydrotreating catalyst of the present embodiment contains an organic compound-derived carbonaceous substance comprising a carbon atom, at a proportion in which the content of the carbonaceous substance in the hydrotreating catalyst is 0.05 to 1% by mass in terms of the carbon atom. Examples of this organic compound-derived carbonaceous substance include carbides obtained by carbonizing an organic compound by heating. A carbon-containing substance that is composed of carbon atoms or carbon atoms and small amounts of hydrogen atoms and/or oxygen atoms and the like, and whose structure is not definitely identified is also encompassed by the carbides. The carbonaceous substance according to the present invention can be produced on the hydrotreating catalyst, for example, by adding an organic compound to the catalyst support that constitutes the hydrotreating catalyst according to the present invention or a precursor of the hydrotreating catalyst described later and calcining or heating this.

In the case where the content of the carbonaceous substance in the catalyst is less than 0.05% by mass, it tends to be impossible to sufficiently suppress the activity of the hydrotreating catalyst for a cracking reaction (cracking activity), thereby making it difficult to improve the yield of a middle distillate, particularly, the yield of a gas oil fraction, in a produced oil. On the other hand, in the case where the content of the carbonaceous substance is more than 1% by mass, reduction in the activity of the hydrotreating catalyst for hydro-isomerization (isomerization activity) becomes significant and thus requires increasing a hydrotreating reaction temperature for maintaining the cold flow property of the middle distillate, particularly, the gas oil fraction, to be generated, and the life of the catalyst tends to be shortened.

As a method for quantifying the carbonaceous substance in the hydrotreating catalyst, a method is adopted in which a sample of the hydrotreating catalyst is heated with high frequency wave in a stream of oxygen for combustion of the carbonaceous substance, and carbon dioxide in the combustion gas is quantified with a detector using infrared absorption (for example, with the carbon/sulfur analyzer EMIA-920V manufactured by Horiba, Ltd.).

Next, a method for producing the hydrotreating catalyst of the present embodiment will be described below by taking two aspects as examples.

First, the first embodiment of the method for producing the hydrotreating catalyst of the present embodiment will be described. The method of the first embodiment is a method of using, as an organic compound source, a molding additives compounded during molding of the catalyst support that constitutes the hydrotreating catalyst to allow the predetermined amount of the carbonaceous substance to be contained in the hydrotreating catalyst.

First, a mixture comprising the above-described amorphous composite metal oxide having solid acidity or a gel thereof, the above-described binder, a molding additives, and, if necessary, a liquid such as water is kneaded to prepare a clay-like kneaded mixture.

Here, the molding additives is an organic compound compounded in order to improve the moldability of the kneaded mixture and the mechanical strength of the resulting molded catalyst support. The molding additives is not particularly limited, but organic compounds with a large molecular weight such as crystalline cellulose, methylcellulose, carboxymethylcellulose, hydroxyethylcellulose, polyvinyl alcohol, starch, and lignin are preferable for sufficiently obtaining effects by compounding the molding additives. This molding additives, in the conventional production of hydrotreating catalysts, is removed during calcination of the catalyst support and/or calcination of the catalyst precursor described later, and the carbonaceous substance derived from the molding additives does not remain in the obtained catalyst. On the other hand, in the first embodiment of the method for producing the hydrotreating catalyst of the present embodiment, the carbonaceous substance derived from the organic compound compounded as the molding additives is allowed to remain in the predetermined amount on the catalyst by adjusting calcination conditions during calcination of the catalyst support and calcination of the catalyst precursor.

The organic compound that is a source from which the carbonaceous substance is derived is not necessarily required to be the molding additives and may be other organic compounds as long as it can produce the predetermined amount of the carbonaceous substance on the catalyst. However, by adopting the method of allowing the molding additives-derived carbonaceous substance to remain in the predetermined amount, the hydrotreating catalyst of the present embodiment can be obtained without largely changing the conventional method for preparing a catalyst except for adjusting conditions for calcination of the catalyst support and calcination of the catalyst precursor described later; thus this method is preferably adopted.

The amount of the molding additives to be compounded is preferably 0.5 to 15% by mass, and more preferably 1 to 10% by mass based on the total mass of the inorganic compounds (the amorphous composite metal oxide having solid acidity, the binder, and the other inorganic compounds compounded in some cases) that constitute the catalyst support.

Next, the above-described kneaded mixture is extrusion molded to thereby obtain a mold, and the mold is further dried at, for example, 70 to 150° C.

Next, the dried mold is calcined to thereby obtain a catalyst support. In this case, the calcination conditions are selected so as to sufficiently exert the mechanical strength of the resulting calcined catalyst support and allow a residue containing the molding additives-derived carbon atom to remain in an appropriate amount on the catalyst support. Here, the residue containing the molding additives-derived carbon atom is a carbon-containing substance comprising carbon atoms or carbon atoms and hydrogen atoms and/or oxygen atoms and the like produced by the calcination of the catalyst support during which the molding additives is cracked due to so-called "carbonization" such as oxidative dehydrogenation, and means one having a structure similar to that of the above-described carbonaceous substance or one that has not been carbonized more than the carbonaceous substance and becomes the carbonaceous substance by calcination of the catalyst precursor described later.

Combinations of various calcination temperatures and calcination times can be set as the catalyst support calcination conditions for satisfying the requirements. In this case, it is preferable to take into consideration the amount of the molding additives to be compounded. For example, as the calcination temperature, the range of 300 to 550° C. is preferable, and the range of 350 to 500° C. is more preferable. In addition, as the calcination time, the range of about 0.1 hour to about 10 hours is preferable, and the range of about 0.2 hour to about 8 hours is more preferable.

Next, a compound containing the above-described active metal element is supported by the catalyst support obtained as described above. The compound containing the noble metal element used in the supporting is not particularly limited as long as it contains the noble metal element, and a known compound is used, but an inorganic or organic compound soluble in a solvent, particularly, water is used. Specific examples of the compound containing the active metal element include: in the case where the noble metal is ruthenium, $RuCl_3$; in the case where the noble metal is osmium, $OsCl_3.3H_2O$ and $(NH_4)_2[OsCl_6]$; in the case where the noble metal is rhodium, $RhCl_3.3H_2O$; in the case where the noble metal is iridium, $H_2IrCl_6.6H_2OH$; in the case where the noble metal is palladium, $(NH_4)_2PdCl_6$, $Pd(NH_3)_4Cl_2.H_2O$, and $Pd(C_2H_5CO_2)_2$; and in the case where the noble metal is platinum, $PtCl_2$, $H_2PtCl_6$, $(NH_4)_2PtCl_6$, $H_2Pt(OH)_6$, $Pt(NH_3)_4Cl_2.H_2O$, and $Pt(C_5H_7O_2)_2$.

The supporting of the compound containing the active metal element can be performed by a known method. Specifically, a method of impregnating the molded catalyst support with a solution, preferably an aqueous solution of the compound, a method of performing ion exchange, or the like, is preferably used. The impregnation method is not particularly limited, and an incipient wetness method or the like is preferably used.

Next, the catalyst support by which the compound containing the active metal element is supported by the method is dried. The drying can be performed at a temperature of, for example, about 70° C. to about 150° C.

The thus-obtained catalyst support by which the compound component containing the active metal element is supported (hereinafter, also referred to as the "catalyst precursor") is calcined to obtain the hydrotreating catalyst of the present embodiment. In the calcination of the catalyst precursor, components other than the active metal atom, that is, counterions, ligands, and the like, are removed from the active metal element-containing compound supported by the catalyst support, while the content of the molding additives-derived carbonaceous substance is adjusted to 0.05 to 1% by mass in terms of the carbon atom.

The calcination conditions for the catalyst precursor can be set to combinations of various calcination temperatures and calcination times. In this case, it is preferable to take into consideration the content of the residue containing the molding additives-derived carbon atom formed on the catalyst support by the calcination of the catalyst support. For example, the calcination temperature is preferably in the range of 300 to 550° C., and more preferably in the range of 350 to 530° C. In addition, as the calcination time, the range of about 0.1 hour to about 10 hours is preferable, and the range of about 0.2 hour to about 8 hours is more preferable.

Noble metals such as platinum and palladium have a catalytic activity for an oxidation reaction. Therefore, in the calcination of the catalyst precursor, oxidation of the residue containing the molding additives-derived carbon atom contained in the catalyst precursor easily proceeds even at a relatively low temperature. Further, the substantial temperature of the catalyst precursor may rise due to the heat of this oxidation reaction, causing the oxidation to rapidly proceed, that is, attaining combustion of the residue. In this case, it tends to be impossible to control the content of the carbonaceous substance in the resulting catalyst, so that the carbonaceous substance completely disappears or a catalyst containing a carbonaceous substance with a smaller content than the predetermined value is obtained. Further, in this case, the substantial temperature of the catalyst precursor tends to rise due to the heat of combustion to largely exceed the set calcination temperature, thereby aggregating the active metal and thus reducing the activity of the obtained catalyst. In order to prevent the occurrence of such a rapid oxidation reaction, it is preferable for the calcination of the catalyst precursor to suppress the rapid oxidation of the residue containing the molding additives-derived carbon atom at least in the early stage thereof, and select conditions under which oxidation gradually proceeds. Specifically, it is preferable to charge the catalyst precursor to a heating apparatus for calcination and sufficiently reduce heating rate within the temperature range in which at least the oxidation of the residue proceeds (for example, about 250° C. to about 400° C.) during heating to the set calcination temperature, thereby preventing the rapid oxidation reaction from occurring in the course of the heating. Such a rate of temperature rise is, for example, 1 to 50° C./h and preferably about 5° C./h to about 30° C./h.

In addition, it is also preferable to calcine the catalyst precursor in 2 stages. Specifically, it is a method comprising the first stage in which calcination is performed under lower temperature conditions so that the oxidation of the residue gradually proceeds, and the second stage in which after the oxidation proceeds and the amount of the remaining residue is decreased to such a degree that rapid oxidation does not proceed, calcination is performed under higher temperature conditions to control the content of the carbonaceous substance in the catalyst. In this case, for example, the range of 250 to 400° C. and, for example, the range of 350 to 550° C. are selected as the calcination temperature in the first stage and the second calcination temperature, respectively.

In this way, the hydrotreating catalyst of the present embodiment can be obtained.

Next, the second embodiment of the method for producing the hydrotreating catalyst of the present embodiment will be described. The method of the second embodiment is a method in which a hydrotreating catalyst that does not contain the carbonaceous substance is temporarily prepared by the conventional method, and the catalyst is dipped in an organic compound and then subjected to a heating treatment to thereby allow the predetermined amount of the carbonaceous substance to be contained in the catalyst.

First, a mixture comprising the above-described amorphous composite metal oxide having solid acidity or a gel thereof, the above-described binder, and, if necessary, a liquid such as water is kneaded to prepare a clay-like kneaded mixture. In this case, a molding additives may be compounded therein, as in the above-described method of the first embodiment. Then, molding and drying of the catalyst support are performed by operation similar to that in the above-described method of the first embodiment.

Next, the obtained dried mold is calcined to obtain a catalyst support. In the case of compounding the molding additives in the step of preparing the kneaded mixture, it is preferable to reduce, when the catalyst support is calcined, the amount of the remaining residue containing the molding additives-derived carbon atom to such a degree that the above-described rapid oxidation does not occur by the calcination of a catalyst precursor (one in which a compound containing the active metal element is supported by the catalyst support) in a later stage. Alternatively, calcination may be performed so that the residue disappears.

Combinations of various calcination temperatures and calcination times can be set as such catalyst support calcination conditions. In this case, it is preferable to take into consideration the amount of the molding additives to be compounded. For example, as the calcination temperature, the range of 300 to 600° C. is preferable, and the range of 350 to 550° C. is more preferable. In addition, as the calcination time, the range of about 0.1 hour to about 10 hours is preferable, and the range of about 0.2 hour to about 8 hours is more preferable.

In this way, the catalyst support is obtained.

Next, a compound containing the active metal element is supported by the catalyst support obtained as described above, and drying is further performed. The supporting of this compound containing the active metal element and the drying can be performed in the same way as in the above-described method of the first embodiment. In this way, the catalyst precursor is obtained.

Next, the obtained catalyst precursor is calcined to obtain a catalyst. The calcination conditions for the catalyst precursor may be similar to the conventional calcination conditions for hydrotreating catalyst precursors, and, for example, the calcination temperature is 350 to 600° C., and the calcination time is about 0.5 hour to about 10 hours. Hereinafter, the catalyst in this stage is also referred to as the "preliminary catalyst".

The preliminary catalyst thus obtained is dipped in a liquid organic compound. The liquid organic compound is not particularly limited as long as it does not contain sulfur, nitrogen, halogen, or the like that becomes a catalytic poison, but a liquid hydrocarbon is preferable, and, for example, a naphtha fraction, a kerosene fraction, or a gas oil fraction produced by a GTL process is preferably used. A method for dipping the catalyst in the liquid organic compound is not particularly limited.

The preliminary catalyst dipped in the liquid organic compound is taken out from the organic compound, and a deoiling treatment is performed in inert gas, preferably, nitrogen gas. By this deoiling treatment, excessive organic compounds attached to the preliminary catalyst by the dipping are volatilized. Conditions of the deoiling treatment cannot be generalized because of varying depending on the organic compound for dipping, and the like, but the temperature is about 180° C. to about 500° C., and the time is about 0.1 hour to about 10 hours.

Next, the preliminary catalyst subjected to the deoiling treatment is subjected to a heat treatment (calcination) under an atmosphere containing molecular oxygen, preferably under an air atmosphere, to carbonize the above-described organic compound, for example, a gas oil remaining in the preliminary catalyst, thereby producing a carbonaceous substance. The calcination conditions can be set appropriately according to the organic compound used, the content of the organic compound remaining in the preliminary catalyst after the deoiling treatment, the content of the carbonaceous substance contained in the catalyst, and the like. For example, the calcination temperature is preferably in the range of 300 to 550° C., and 350 to 530° C. is more preferable. The calcination time is preferably about 0.1 hour to about 10 hours, and more preferably about 0.2 hour to about 8 hours. In this way, the carbonaceous substance is produced in the catalyst so that its content becomes 0.05 to 1% by mass in terms of the carbon atom.

In the above-described example, the preliminary catalyst obtained by calcining the catalyst precursor is dipped in the organic compound and calcined again after the deoiling treatment to obtain the hydrotreating catalyst of the present embodiment, whereas the catalyst precursor is dipped in the organic compound without calcining the catalyst precursor and the hydrotreating catalyst may be obtained by one calcining after the deoiling treatment.

In this way, the hydrotreating catalyst of the present embodiment can be obtained.

Next, a process for producing a hydrocarbon oil of the present invention will be described.

The process for producing a hydrocarbon oil of the present invention comprises a step of contacting a raw oil comprising 80% by mass or more of straight-chain aliphatic hydrocarbons with a boiling point of 25 to 360° C. and comprising 20% by mass or more of straight-chain aliphatic hydrocarbons with a boiling point of 150 to 360° C., with the above-described hydrotreating catalyst of the present invention in the presence of molecular hydrogen. By this step, hydrotreating of the raw oil, that is, removal of olefins and oxygen-containing compounds that are impurities contained in the raw oil, and hydro-isomerization of the straight-chain aliphatic hydrocarbons are performed.

Hereinafter, an embodiment of the process for producing a hydrocarbon oil of the present invention will be described with reference to an example of a GTL process in which the process for producing a hydrocarbon oil of the present invention is preferably used.

FIG. 1 is a schematic configuration view showing a production facility corresponding to an upgrading unit in the GTL process including an apparatus for producing a hydrocarbon oil in which one embodiment of the process for producing a hydrocarbon oil of the present invention is carried out.

First, referring to FIG. 1, an apparatus for producing naphtha and a base stock for kerosene and gas oil from hydrocarbons obtained by a FT synthesis reaction (FT synthetic oil), in which a suitable embodiment of the process for producing a hydrocarbon oil of the present invention is carried out, will be described.

An apparatus for producing a hydrocarbon oil 100 shown in FIG. 1 is fed with a FT synthetic oil through a line 1 from a FT synthesis reaction apparatus (not shown) that synthesizes a hydrocarbon oil (FT synthetic oil) by a FT synthesis reaction with a synthesis gas (mixed gas of carbon monoxide gas and hydrogen gas) as a raw material. The FT synthesis reaction apparatus is fed with synthesis gas from a reforming reaction apparatus (not shown) that reforms natural gas to produce synthesis gas.

The apparatus for producing a hydrocarbon oil 100 mainly comprises a first fractionator 20 of fractionating a FT synthetic oil to a raw naphtha fraction, a raw middle distillate, and a raw wax fraction, a naphtha fraction hydrotreating reactor 30 of hydrotreating the raw naphtha fraction fed from the top of the first fractionator 20 by a line 2, a middle distillate hydrotreating reactor 32 of hydrotreating and hydro-isomerizing the raw middle distillate fed from the middle portion of the first fractionator 20 by a line 3, a wax fraction hydrocracking reactor 34 of hydrocracking the raw wax fraction fed from the bottom portion of the first fractionator 20 by a line 4, and a second fractionator 60 of fractionating the hydrotreated middle distillate and the hydrocracked wax fraction.

Here, the naphtha fraction is a hydrocarbon fraction with a boiling point of approximately 25° C. or higher and lower than approximately 150° C. (approximately $C_5$ to $C_{10}$), the middle distillate is a hydrocarbon fraction with a boiling point of approximately 150 to 360° C. (approximately $C_{11}$ to $C_{21}$), and the wax fraction is a hydrocarbon fraction with a boiling point of higher than approximately 360° C. (approximately $C_{22}$ or more). In addition, the raw naphtha fraction, the raw middle distillate, and the raw wax fraction are the respective fractions that are neither hydrotreated nor hydrocracked and contain olefins and oxygen-containing compounds such as alcohols that are impurities (by-products of the FT synthesis reaction) other than saturated aliphatic hydrocarbons (paraffins).

The middle distillate hydrotreating reactor 32 is an apparatus for carrying out the process for producing a hydrocarbon oil of the present embodiment and is preferably packed with the above-described hydrotreating catalyst of the present embodiment as a fixed bed in the inside thereof. The raw middle distillate fed by the line 3 is mixed with hydrogen gas fed by a hydrogen gas feed line (not shown) connected to the line 3, heated to a reaction temperature by a heating device (not shown) such as a heat exchanger provided on the line 3, thereafter fed to the middle distillate hydrotreating reactor 32 and subjected to hydrotreating including hydro-isomerization.

The naphtha fraction hydrotreating reactor 30 is preferably packed with a hydrotreating catalyst as a fixed bed. The hydrotreating catalyst may be the above-described hydrotreating catalyst of the present embodiment. The raw naphtha fraction fed by the line 2 is mixed with hydrogen gas fed by a hydrogen gas feed line (not shown) connected to the line 2, heated to a reaction temperature by a heating device (not shown) such as a heat exchanger provided on the line 2, thereafter fed to the naphtha fraction hydrotreating reactor 30 and hydrotreated.

The wax fraction hydrocracking reactor 34 is preferably packed with a hydrocracking catalyst as a fixed bed. The raw wax fraction fed by the line 4 is mixed with an uncracked wax (described later in detail) recycled by a line 13 connected to the line 4 and hydrogen gas fed by a hydrogen gas feed line (not shown) connected to the line 4, heated to a reaction temperature by a heating device (not shown) such as a heat exchanger provided on the line 4, thereafter fed to the wax fraction hydrocracking reactor 34 and hydrocracked.

The apparatus for producing a hydrocarbon oil 100 comprises gas liquid separators 40, 42, and 44 downstream of the naphtha fraction hydrotreating reactor 30, the middle distillate hydrotreating reactor 32, and the wax fraction hydrocracking reactor 34, respectively, to separate, into gas and liquid, hydrotreated or hydrocracked liquid hydrocarbons discharged from each reactor, and a gas component containing unreacted hydrogen gas and gaseous hydrocarbons. In addition, each gas liquid separator is equipped with an apparatus (not shown) for discharging water produced as by-products during hydrotreating or hydrocracking.

The apparatus for producing a hydrocarbon oil 100 comprises, downstream of the gas liquid separator 40, a naphtha stabilizer 50 of discharging, from a line 8 connected to the top thereof, gaseous hydrocarbons containing hydrocarbons having carbon number of 4 or less as a main component from the hydrotreated naphtha fraction fed through the line 5. Also, a naphtha tank 70 is provided for pooling the naphtha fraction from which gaseous hydrocarbons have been removed and fed by a line 9 from the bottom of the naphtha stabilizer 50.

The second fractionator 60 is provided downstream of the gas liquid separator 42 and the gas liquid separator 44 and fed with the hydrotreated middle distillate fed from the gas liquid separator 42 through a line 6 and the hydrocracked wax fraction fed from the gas liquid separator 44 through a line 7, to fractionate their mixture. The second fractionator 60 is provided with a line 11 which is connected to the middle portion thereof for discharging the fractionated kerosene fraction and transferring it to a kerosene tank 72, and a line 12 which is connected to the lower portion thereof for discharging the fractionated gas oil fraction and transferring it to a gas oil tank 74. In addition, the line 13 for discharging a bottom oil of the second fractionator 60 containing the uncracked wax, which has not sufficiently be cracked in the wax fraction hydrocracking reactor 34, as a main component, and recycling it to the line 4 upstream of the wax fraction hydrocracking reactor 34 is connected to the bottom of the second fractionator 60. Further, a line 10 of discharging light hydrocarbons containing the naphtha fraction as a main component and feeding it to the naphtha stabilizer 50 is connected to the top of the second fractionator 60.

Next, referring to FIG. 1, one embodiment of the process for producing a hydrocarbon oil of the present invention will be described.

A FT synthetic oil fed from a FT synthesis reaction apparatus (not shown) through a line 1 is fractionated in the first fractionator 20 to a raw naphtha fraction, a raw middle distillate, and a raw wax fraction. The fractionated raw middle distillate is taken out by the line 3 from the middle portion of the first fractionator 20. The middle distillate is generally a fraction comprising a mixture of hydrocarbons with a boiling point of approximately 150 to 360° C. (approximately $C_{11}$ to $C_{21}$). The raw middle distillate obtained by fractionating the FT synthetic oil contains straight-chain saturated aliphatic hydrocarbons with the boiling point range as a main component and contains olefins and oxygen-containing compounds such as alcohols that are by-products of the FT synthesis reaction, as impurities. The raw middle distillate is mixed with hydrogen gas, thereafter heated to a reaction temperature and fed to the middle distillate hydrotreating reactor 32. The reactor is packed with the above-described hydrotreating catalyst of the present embodiment, and the mixture of the raw middle distillate and hydrogen gas comes into contact with the catalyst, on which hydrotreating and hydro-isomerization of the raw middle distillate proceed.

The hydrotreating of the raw middle distillate is a reaction that removes impurities (olefins and oxygen-containing compounds such as alcohols) contained in the raw middle distillate. The olefins (unsaturated aliphatic hydrocarbons) are hydrogenated and converted to saturated aliphatic hydrocarbons (paraffins). In addition, the oxygen-containing compounds such as alcohols are hydrogenation deoxidized and converted to saturated aliphatic hydrocarbons, water, and the like.

Hydro-isomerization converts straight-chain saturated aliphatic hydrocarbons (normal paraffins) to branched-chain saturated hydrocarbons (isoparaffins) by skeletal isomerization. By the hydro-isomerization, the content of normal paraffins in the middle distillate is reduced, while the content of isoparaffins is increased, thereby reducing the crystallinity of the paraffins and thus improving cold flow property as a fuel oil. As an index for determining the degree of proceeding of hydro-isomerization, for example, the ratio of octadecanes having a branched chain (isooctadecanes) to hydrocarbons having carbon number of 18 (C18; octadecanes) (100×mass of isooctadecanes/mass of all octadecanes (%); hereinafter, referred to as the "$C_{18}$ isomer ratio") can be used. For satisfying cold flow property as a base stock for gas oil, it is preferable that the $C_{18}$ isomer ratio be, for example, 85% or more.

In the present embodiment, in order to perform hydro-isomerization so that the degree of proceeding of hydro-isomerization represented by, for example, the $C_{18}$ isomer ratio, satisfies the criterion, operation is performed mainly by adjusting the reaction temperature of the middle distillate hydrotreating reactor 32.

The reaction temperature in the middle distillate hydrotreating reactor 32 is 180 to 400° C., preferably 200 to 370° C., more preferably 250 to 350° C., and particularly preferably 280 to 340° C. Here, the reaction temperature refers to the weight average temperature of a catalyst bed in the middle distillate hydrotreating reactor 32. If the reaction temperature is higher than 400° C., not only cracking into the light fraction tends to proceed to reduce the yield of the middle distillate, but also the product tends to be colored and to be restricted to use as the base stock for fuel oil. On the other hand, if the reaction temperature is lower than 180° C., oxygen-containing compounds such as alcohols tend not to sufficiently be removed to remain, and production of isoparaffins by the hydro-isomerization reaction tends to be suppressed.

A pressure (hydrogen partial pressure) in the middle distillate hydrotreating reactor 32 is preferably 0.5 to 12 MPa, and more preferably 1 to 5 MPa. In the case where the pressure is lower than 0.5 MPa, hydrotreating and hydro-isomerization tend not to sufficiently proceed; on the other hand, in the case where the pressure is higher than 12 MPa, high pressure resistance is demanded for the apparatus, and facility cost tends to be increased.

A liquid hourly space velocity (LHSV) in the middle distillate hydrotreating reactor 32 is preferably 0.1 to 10 $h^{-1}$, and more preferably 0.3 to 3.5 $h^{-1}$. In the case where the LHSV is lower than 0.1 $h^{-1}$, cracking into the light fraction tends to proceed to reduce the yield of the middle distillate, and productivity tends to be reduced; on the other hand, in the case where the LHSV is higher than 10.0 $h^{-1}$, hydrotreating and hydro-isomerization tend not to sufficiently proceed.

A ratio of hydrogen gas/oil in the middle distillate hydrotreating reactor 32 is preferably 50 to 1000 NL/L, and more preferably 70 to 800 NL/L. Here, the "NL" means a hydrogen capacity (L) at the normal state (0° C., 101325 Pa). In the case where the ratio of hydrogen gas/oil is lower than 50 NL/L, hydrotreating and hydro-isomerization tend not to sufficiently proceed; on the other hand, in the case where the ratio of hydrogen gas/oil is higher than 1000 NL/L, a large-sized hydrogen feeding apparatus and the like tend to be needed.

In the middle distillate hydrotreating reactor 32, the hydro-isomerization reaction is performed, as described above, to convert straight-chain saturated aliphatic hydrocarbons (normal paraffins) that are main components in the raw middle distillate to branched-chain saturated hydrocarbons (isoparaffins), but it is necessary to convert the normal paraffins over a given proportion in the raw middle distillate to isoparaffins (for example, it is preferable that the $C_{18}$ isomer ratio be 85% or more) for satisfying the specification of the cold flow property as a base stock for liquid fuel of the gas oil fraction obtained from the produced oil.

On the other hand, in the hydrotreating of the raw middle distillate, the cracking reaction (hydrocracking reaction) of hydrocarbons occurs as a side reaction. This cracking reaction cleaves carbon-carbon bonds in hydrocarbons to produce hydrocarbons having fewer carbon atoms. Thus, if this cracking reaction becomes predominant, production of light hydrocarbons is increased to reduce the yield of the middle distillate (with a boiling point of approximately 150 to 360° C.), particularly, the yield of the gas oil fraction (with a boiling point of approximately 250 to 360° C.).

The hydro-isomerization reaction is known to proceed by two catalytic functions, that is, a hydrogenation-dehydrogenation activity by the active metal and the solid acidity of the catalyst support in the hydrotreating catalyst, while the hydrocracking reaction also proceeds by these two catalytic functions. Thus, if the hydro-isomerization was allowed to proceed to a given level with the reaction temperature of the hydrotreating reactor 32 adjusted for securing the cold flow property of the produced oil, particularly, the gas oil fraction, using the conventional hydrotreating catalyst, the cracking reaction also tended to proceed simultaneously therewith to reduce the yield of the middle distillate, particularly, the yield of the gas oil fraction. More specifically, if the hydrotreating of the raw middle distillate was performed by adjusting the reaction temperature of the middle distillate hydrotreating reactor 32 so that, for example, the above-described $C_{18}$ isomer ratio became 85%, the cracking reaction tended to proceed as a side reaction to increase the production of a light fraction with a boiling point lower than the lower limit of the boiling point range of the gas oil fraction (with a boiling point of, for example, 250 to 360° C.) and reduce the yield of the gas oil fraction.

By contrast, by having the above-described particular configuration, the hydrotreating catalyst of the present embodiment can achieve both a high hydro-isomerization activity and a suppressed hydrocracking activity, and by using the catalyst, a high $C_{18}$ isomer ratio and a high yield of the middle distillate, particularly, a high yield of the gas oil fraction, can be achieved simultaneously.

Although the mechanism of effect under which such features possessed by the hydrotreating catalyst of the present embodiment are exerted is not clarified, the present inventors presume it as follows. Namely, the hydrotreating catalyst has two functions, that is, a hydrogenation-dehydrogenation activity by the active metal and solid acidity possessed by the catalyst support. The hydro-isomerization reaction and the hydrocracking reaction that is a side reaction are considered to proceed by the two functions combined together. On the other hand, the organic compound-derived carbonaceous substance contained in the hydrotreating catalyst of the present invention is considered to inhibit, particularly, the action of active sites (acid sites) having solid acidity on the catalyst support. One having an activity for mainly the cracking reaction or both the cracking reaction and the isomerization reaction and one having an activity for mainly hydro-isomerization are presumed to be included in the acid sites. In the hydrotreating catalyst of the present embodiment, 0.05 to 1% by mass of the carbonaceous substance in terms of the carbon atom is contained, and this carbonaceous substance is presumed to thereby selectively act on the acid site having an activity for the cracking reaction or both the cracking reaction and the isomerization reaction to inhibit the activity. Thus, it is considered that although the carbonaceous substance reduces some hydro-isomerization activities, the range of this reduction is small, and by contrast, it can considerably suppress the activity for the cracking reaction. As a result, even if the reaction temperature is increased so that reduction in hydro-isomerization activity is compensated in order to maintain the necessary $C_{18}$ isomer ratio, a high yield of the gas oil fraction compared with the conventional hydrotreating catalyst can presumably be obtained because the cracking reaction is sufficiently suppressed.

The product discharged from the middle distillate hydrotreating reactor 32 is introduced into the gas liquid separator 42 by which a liquid product (liquid hydrocarbons) is separated from a gas component containing unreacted hydrogen gas and gaseous hydrocarbons as main components. The liquid hydrocarbons are introduced in the second fractionator 60 downstream thereof, and the gas component is reused in the hydroprocessing reaction.

The raw naphtha discharged from the top of the first fractionator 20 is mixed with hydrogen gas through the line 2, heated to a reaction temperature, fed to the naphtha fraction hydrotreating reactor 30 and hydrotreated.

As the hydrotreating catalyst packed into the naphtha fraction hydrotreating reactor 30, a known hydrotreating catalyst can be used, but the above-described hydrotreating catalyst of the present embodiment may be used. In the naphtha fraction hydrotreating reactor 30, the olefins contained in the raw naphtha fraction are converted to saturated hydrocarbons by hydrogenation, and the oxygen-containing compounds such as alcohols are converted to hydrocarbons, water, and the like by hydro-deoxidation. The raw naphtha fraction is hydrocarbons having carbon number of approximately 10 or less, and rare occurrences of hydro-isomerization and hydrocracking as its characteristics.

In the raw naphtha fraction, the olefins and the oxygen-containing compounds such as alcohols are contained at relatively high concentrations, and the large heat of reaction is generated in the hydrotreating reaction that converts these to saturated hydrocarbons. Thus, if only the raw naphtha fraction is subjected to hydrotreating, there is the case where the temperature of the naphtha fraction excessively rises in the naphtha fraction hydrotreating reactor 30. Thus, it is preferable that a portion of the hydrotreated naphtha fraction discharged from the naphtha fraction hydrotreating reactor 30 be recycled by a line 14 to the line 2 upstream of the naphtha fraction hydrotreating reactor 30, thereby diluting the raw naphtha fraction with the already-refined naphtha fraction and then subjecting it to hydrotreating.

A reaction temperature in the naphtha fraction hydrotreating reactor 30 is 180 to 400° C., preferably 280 to 350° C., and more preferably 300 to 340° C. Here, the reaction temperature refers to the average temperature of a catalyst bed in the naphtha fraction hydrotreating reactor 30. When the reaction temperature is the lower limit temperature or more, the raw naphtha fraction is sufficiently hydrotreated, and when the reaction temperature is the upper limit temperature or lower, reduction in the life of the catalyst is suppressed.

A pressure (hydrogen partial pressure) in the naphtha fraction hydrotreating reactor 30 is preferably 0.5 to 12 MPa, and more preferably 1 to 5 MPa. When the pressure is 0.5 MPa or higher, the raw naphtha fraction is sufficiently hydrotreated, and when the pressure is 12 MPa or lower, facility cost for enhancing the pressure resistance of the facility can be reduced.

A liquid hourly space velocity (LHSV) in the naphtha fraction hydrotreating reactor 30 is preferably 0.1 to 10 h$^{-1}$, and more preferably 0.3 to 3.5 h$^{-1}$. When the LHSV is 0.1 h$^{-1}$ or higher, the capacity of the reactor does not have to be excessively large, and when the LHSV is 10 h$^{-1}$ or lower, the raw naphtha fraction is efficiently hydrotreated.

A ratio of hydrogen gas/oil in the naphtha fraction hydrotreating reactor 30 is preferably 50 to 1000 NL/L, and more preferably 70 to 800 NL/L. Here, the "NL" means a hydrogen capacity (L) at the normal state (0° C., 101325 Pa). When the ratio of hydrogen gas/oil is 50 NL/L or higher, the raw naphtha fraction is sufficiently hydrotreated, and when the ratio of hydrogen gas/oil is 1000 NL/L or lower, a facility for feeding a large amount of hydrogen gas becomes unnecessary, and an increase in operation cost can be suppressed.

The produced oil discharged from the naphtha fraction hydrotreating reactor 30 is separated in the gas liquid separator 40 into gas and liquid as a gas component containing unreacted hydrogen gas as a main component and liquid hydrocarbons. The gas component is reused in the hydroprocessing reaction, and the liquid hydrocarbons are fed through the line 5 to the naphtha stabilizer 50 by which $C_4$ or less gaseous hydrocarbons are then removed from the line 8 and the naphtha fraction consisting mainly of $C_5$ to $C_{10}$ is stored into the naphtha tank 70 through the line 9.

The raw wax fraction discharged from the bottom of the first fractionator 20 by the line 4 is mixed with an uncracked wax (described later in detail) recycled by the line 13 connected to the line 4 and hydrogen gas, heated to a reaction temperature, fed to the wax fraction hydrocracking reactor 34 and hydrocracked.

Examples of the hydrocracking catalyst packed into the wax fraction hydrocracking reactor 34 include catalysts in which a metal belonging to Group 8 to Group 10 in the periodic table as an active metal is supported by a catalyst support comprising a solid acid.

Examples of the suitable catalyst support include those comprising crystalline zeolites such as ultra stable Y (USY)-type zeolite, Y-type zeolite, mordenite, and β zeolite, and one or more solid acids selected from amorphous composite metal oxides having solid acidity, such as silica alumina, silica zirconia, and alumina boria. Further, as the catalyst support, those comprising USY-type zeolite, and one or more solid acids selected from silica alumina, alumina boria, and silica zirconia are more preferable, and those comprising USY-type zeolite and alumina boria and/or silica alumina are still more preferable.

The average particle size of USY-type zeolite is not particularly limited, but it is preferably not larger than 1.0 μm, and more preferably not larger than 0.5 μm. In addition, in USY-type zeolite, it is preferable that a molar ratio of silica/alumina (molar ratio of silica to alumina) be 10 to 200, and it is more preferable that the molar ratio be 15 to 100, and it is still more preferable that the molar ratio be 20 to 60.

In addition, it is preferable that the catalyst support be constituted by containing 0.1 to 80% by mass of a crystalline zeolite and 0.1 to 60% by mass of an amorphous composite metal oxides having solid acidity.

The catalyst support can be produced as follows: a catalyst support comprising the solid acid and a binder is molded, and calcined. The proportion of the solid acid to be compounded is preferably 1 to 70% by mass, and more preferably 2 to 60% by mass based on the entire mass of the catalyst support. In addition, in the case where the catalyst support is constituted by containing USY-type zeolite, the proportion of USY-type zeolite to be compounded is preferably 0.1 to 10% by mass, and more preferably 0.5 to 5% by mass based on the entire mass of the catalyst support. Further, in the case where the catalyst support is constituted by containing USY-type zeolite and alumina boria, it is preferable that the proportion of USY-type zeolite to alumina boria to be compounded (USY zeolite/alumina boria) be 0.03 to 1 in the mass ratio. In addition, in the case where the catalyst support is constituted by containing USY-type zeolite and silica alumina, it is preferable that the proportion of USY-type zeolite to silica alumina to be compounded (USY zeolite/silica alumina) be 0.03 to 1 in the mass ratio.

The binder is not particularly limited, but alumina, silica, titania, and magnesia are preferable, and alumina is more preferable. The amount of the binder to be compounded is preferably 20 to 98% by mass, and more preferably 30 to 96% by mass based on the entire mass of the catalyst support.

A calcination temperature of the catalyst support is preferably in the range of 400 to 550° C., more preferably in the range of 470 to 530° C., and still more preferably in the range of 490 to 530° C.

Examples of the metal belonging to Group 8 to Group 10 in the periodic table as the active metal specifically include cobalt, nickel, rhodium, palladium, iridium, and platinum. Among them, metals selected from nickel, palladium, and platinum, preferably palladium and platinum are preferably used singularly or in combinations of two or more. These metals can be supported on the catalyst support mentioned above by a standard method such as impregnation and ion exchange. The amount of the metal to be supported is not particularly limited, but it is preferable that in the case where the metal is a metal other than noble metals such as cobalt and nickel, the amount be 2 to 50% by mass as a metal oxide based on the mass of the catalyst support. In addition, it is preferable that in the case where the metal is a noble metal such as platinum, palladium, rhodium, and iridium, the entire amount of the metal be 0.1 to 3.0% by mass based on the entire mass of the catalyst support. In the case where the content of the metal having a hydrogenation activity is less than the lower limit value, hydrocracking tends not to sufficiently proceed. On the other hand, in the case where the content of the metal having a hydrogenation activity is more than the upper limit value, dispersion of the metal having a hydrogenation activity tends to be reduced to reduce the activity of the catalyst, and cost of the catalyst is increased.

A mixture of the raw wax fraction and the uncracked wax (hereinafter, also referred to as the "wax for processing") is hydrocracked in the wax fraction hydrocracking reactor 34 and converted to a component corresponding to the middle distillate. In this case, the olefins contained in the raw wax fraction are hydrogenated and converted to paraffin hydrocarbons, and the oxygen-containing compounds such as alcohols are hydro-deoxidized and converted to paraffin hydrocarbons, water, and the like. Further, the production of isoparaffins by hydro-isomerization of normal paraffins contributing to improving cold flow property as a base stock for fuel oil also proceeds. In addition, a part of the wax for processing excessively undergoes hydrocracking, and is converted to hydrocarbons corresponding to a naphtha fraction with a boiling point lower than that of hydrocarbons with a boiling point range comparable to the middle distillate intended. In addition, a part of the wax for processing is further hydrocracked and converted to gaseous hydrocarbons having carbon number of 4 or less, such as butanes, propane, ethane, and methane. On the other hand, a part of the wax for processing is discharged as the uncracked wax from the wax fraction hydrocracking reactor 34 without being sufficiently hydrocracked.

In the hydrocracking of the wax for processing in the wax fraction hydrocracking reactor 34, it is desirable that a "cracking rate" defined by the following formula (1) be 50 to 90%, preferably 60 to 80%.

Cracking rate (%)=((mass of hydrocarbons with boiling point of higher than 360° C. in unit mass of wax for processing)−(mass of hydrocarbons with boiling point of higher than 360° C. in unit mass of hydrocracking product))×100/ (mass of hydrocarbons with boiling point of higher than 360° C. in unit mass of wax for processing) (1)

In the case where the cracking rate is lower than 50%, the hydrocracking of the wax for processing is insufficient to reduce the ratio of the fraction with a boiling point range comparable to the middle distillate accounting for the hydrocracking product. On the other hand, in the case where the cracking rate is higher than 90%, the cracking of the wax for processing excessively proceed to increase the production of hydrocarbons with a boiling point lower than the lower limit in the boiling point of the middle distillate, thereby reducing the ratio of the middle distillate accounting for the cracking product. A method is general in which the cracking rate is controlled by a reaction temperature in the wax fraction hydrocracking reactor 34.

It is to be noted that the above-described "uncracked wax" refers to one in which hydrocracking does not proceed until the boiling point becomes 360° C. or lower in the wax for processing. The uncracked wax is separated as a bottom oil in the second fractionator 60 described later and recycled to the wax fraction hydrocracking reactor 34. In addition, the "hydrocracking product" means all products comprising the uncracked wax discharged from the wax fraction hydrocracking reactor 34, unless otherwise noted.

Examples of a reaction temperature in the wax fraction hydrocracking reactor 34 (weight average catalyst bed temperature) can include 180° C. to 400° C., preferably 200° C. to 370° C., more preferably 250° C. to 350° C., and further preferably 280° C. to 350° C. If the reaction temperature is higher than 400° C., the hydrocracking excessively proceeds, and the yield of the middle distillate intended tends to be reduced. Further, the hydrocracking product is colored and is limited to be used as a base stock for fuel in some cases. On the other hand, if the reaction temperature is lower than 180° C., the hydrocracking of the wax fraction does not proceed sufficiently, and the yield of the middle distillate tends to be reduced. Further, the olefins and the oxygen-containing compounds such as alcohols in the wax fraction tend not to be sufficiently removed.

A hydrogen partial pressure in the wax fraction hydrocracking reactor 34 is for example 0.5 to 12 MPa, and 1.0 to 5.0 MPa is preferable.

A liquid hourly space velocity (LHSV) in the wax fraction hydrocracking reactor 34 is for example 0.1 to 10.0 $h^{-1}$, and 0.3 to 3.5 $h^{-1}$ is preferable. A ratio of the hydrogen gas and the wax fraction (ratio of hydrogen gas/oil) is not particularly limited, but it is for example 50 to 1000 NL/L, and 70 to 800 NL/L is preferable. Here, the "NL" means a hydrogen capacity (L) at the normal state (0° C., 101325 Pa). In the case where the ratio of hydrogen gas/oil is lower than 50 NL/L, hydrocracking tends not to sufficiently proceed; on the other hand, in the case where the ratio of hydrogen gas/oil is higher than 1000 NL/L, a large-sized hydrogen feeding source tends to be needed.

The hydrocracking product discharged from the wax fraction hydrocracking reactor 34 is separated into gas and liquid in the gas liquid separator 44. Specifically, a gas component comprising unreacted hydrogen gas and hydrocarbon gas of mainly $C_4$ or less is separated from a liquid component that is a hydrocarbon oil with a carbon number distribution corresponding to from the naphtha fraction to the uncracked wax. The separated gas component is reused in the hydroprocessing reaction. The liquid component is mixed with the hydrotreated middle distillate fed from the middle distillate hydrotreating reactor 32 through the gas liquid separator 42, and fed to the second fractionator 60.

In the second fractionator 60, a plurality of cut points are set depending on the hydrocarbon oil to be discharged, so that a mixed oil of the hydrotreated middle distillate fed from the middle distillate hydrotreating reactor 32 and the hydrocracked wax fraction fed from the wax fraction hydrocracking reactor 34 is fractionated.

In the present embodiment, the cut points are set at 150° C., 250° C., and 360° C. From the top of the second fractionator 60, the light fraction containing the naphtha fraction is discharged by the line 10 and fed to the naphtha stabilizer 50 by which $C_4$ or less hydrocarbon gas is then removed to store product naphtha into the naphtha tank 70. From the central portion of the second fractionator 60, the kerosene fraction is discharged by the line 11 and stored in the kerosene tank 72. From the lower portion of the second fractionator 60, the gas oil fraction is discharged by the line 12 and stored in the gas oil tank 74. From the bottom of the second fractionator 60, the bottom oil containing the uncracked wax as a main component is discharged by the line 13, recycled to the line 4, fed to the wax fraction hydrocracking reactor 34 together with the raw wax fraction and hydrocracked again.

In this way, the gas oil fraction, the kerosene fraction, and the naphtha fraction are obtained.

The process for producing a hydrocarbon oil of the present invention is not limited to an example of the above-described embodiment, and various alterations, substitutions, additions and the like can be made without departing from the spirit of the present invention.

For example, in the above-described embodiment, an embodiment is adopted in which the FT synthetic oil fed from the FT synthesis reaction apparatus is fractionated in the first fractionator 20 to a raw naphtha fraction, a raw middle distillate, and a raw wax fraction, but in this fractionation, the raw naphtha fraction and the raw middle distillate may be obtained as one fraction as a raw naphtha/middle distillate. Then, the raw naphtha/middle distillate may be subjected to hydrotreating in a single hydrotreating reactor packed with the hydrotreating catalyst of the present invention.

Further, the FT synthetic oil may be fractionated, without being fractionated in the first fractionator 20, by gas liquid separation at a temperature in the FT synthesis reaction apparatus into light liquid hydrocarbons by cooling and liquefying light hydrocarbons that are in a gas state at the temperature, and heavy liquid hydrocarbons that are in a liquid state at the temperature. Then, without providing the naphtha fraction hydrotreating reactor 30, the light liquid hydrocarbons are subjected to hydrotreating in the middle distillate hydrotreating reactor 32 packed with the hydrotreating catalyst of the present invention, and the heavy liquid hydrocarbons may be subjected to hydrocracking in the wax fraction hydrocracking reactor 34.

In addition, in the above-described embodiment, an embodiment is adopted in which a mixture of the hydrotreated middle distillate discharged from the middle distillate hydrotreating reactor 32 and the hydrocracking product of the wax fraction discharged from the wax fraction hydrocracking reactor 34 is fractionated in the second fractionator 60, but not limited to this, and, for example, the hydrotreated middle distillate discharged from the middle distillate hydrotreating reactor 32 and the hydrocracking product of the wax fraction discharged from the wax fraction hydrocracking reactor 34 may separately be fractionated in the respective fractionators.

Further, in the above-described embodiment, the naphtha fraction, the kerosene fraction, and the gas oil fraction are obtained as products, but the kerosene fraction and the gas oil fraction may be obtained as one fraction (middle distillate).

EXAMPLES

Hereinafter, the present invention will be described in more detail by Examples, but it is not to be limited to the following Examples.

Example 1

Preparation of Hydrotreating Catalyst

Water was added to a composition containing 60% by mass of powdered silica zirconia (molar ratio of silica/zirconia (molar ratio of silica to zilconia): 7) and 40% by mass of powdered alumina and kneaded into a clay-like form, and starch was compounded therein as a molding additives at a proportion of 5% by mass based on the total mass of silica zirconia and alumina and further kneaded to prepare a kneaded mixture. This kneaded mixture was molded by extrusion molding into a cylinder with a diameter of about 1.5 mm and a length of about 3 mm. The obtained mold was dried at 120° C. for 3 hours and further calcined in air at 450° C. for 3 hours to obtain a catalyst support. As a result of measuring the content of a residue containing the starch-derived carbon atom contained in this catalyst support using the carbon/sulfur analyzer EMIA-920V manufactured by Horiba, Ltd., it was 1.1% by mass based on the mass of the catalyst support.

This catalyst support was impregnated by an incipient wetness method with an aqueous solution of dichlorotetraammine platinum (II) to be 0.8% by mass as a platinum atom based on the mass of the catalyst support and further dried at 120° C. for 3 hours to obtain a catalyst precursor.

Next, the catalyst precursor obtained above was calcined. The catalyst precursor was charged into a heating furnace, heated to 300° C. under an air atmosphere, then heated at a heating rate of 10° C./h between 300 and 400° C., and then calcined at 500° C. for 1 hour to obtain a hydrotreating catalyst. As a result of quantifying the carbonaceous substance in the resulting hydrotreating catalyst using the above-described carbon/sulfur analyzer, it was 0.06% by mass in terms of the carbon atom based on the mass of the catalyst.

<Production of Hydrocarbon Oil>

The hydrotreating catalyst obtained above was packed in a fixed bed flow reactor, and reduced under a stream of hydrogen at 340° C. for 4 hours to be activated.

Next, a FT synthetic oil obtained by a FT synthesis reaction was fractionated in a fractionator to obtain, as a raw oil, a hydrocarbon oil ($C_{11}$ to $C_{21}$) in a middle distillate with a boiling point of 150 to 360° C. As a result of analyzing this raw oil, it was normal paraffin containing 3.6% by mass of olefins and 4.0% by mass of oxygen-containing compounds.

The raw oil was fed together with hydrogen gas to the fixed bed flow reactor packed with the hydrotreating catalyst to perform hydrotreating (hydrotreating reaction and hydroisomerization reaction). The reaction conditions were set to a reaction pressure (pressure of hydrogen gas) of 3.0 MPa, LHSV of 2.0 $h^{-1}$, and a ratio of hydrogen/oil of 340 NL/L. In addition, octadecanes ($C_{18}$) in the product were analyzed by gas chromatograph, the ratio of octadecanes having a branched chain (isooctadecanes) to all octadecanes (100× mass of isooctadecanes/mass of all octadecanes; $C_{18}$ isomer ratio) was calculated, and a reaction temperature was determined so that this $C_{18}$ isomer ratio became 85%. The reaction temperature was 336° C.

The product discharged from the reactor was cooled to about 35° C. by a heat exchanger and separated into a gas component and a liquid component by a gas liquid separator, and the liquid component (hydrocarbon oil) was fed to a fractionator and fractionated with the cut point being 250° C. to obtain a fraction with a boiling point of 250° C. or higher as a gas oil fraction. Then, the yield of the gas oil fraction was calculated from the ratio of the flow rate of the gas oil fraction discharged from the fractionator to the mass flow rate of the fed raw oil. The yield of the gas oil fraction was 43% by mass. Neither olefins nor oxygen-containing compounds were substantially contained in the liquid hydrocarbons separated by the gas liquid separator. The results are shown in Table 1.

Example 2

Preparation of Hydrotreating Catalyst

A hydrotreating catalyst was obtained in the same way as in Example 1 except that the calcination time at 500° C. was set to 0.5 hour in the calcination of the catalyst precursor. The content of the carbonaceous substance in the hydrotreating catalyst was 0.3% by mass in terms of the carbon atom.
<Production of Hydrocarbon Oil>
Hydrotreating of the FT synthetic oil-derived middle distillate was performed in the same way as in Example 1 using the hydrotreating catalyst obtained above. A reaction temperature at which the $C_{18}$ isomer ratio became 85% was 338° C., and the yield of the gas oil fraction was 44% by mass. In addition, neither olefins nor oxygen-containing compounds were substantially contained in the liquid hydrocarbons separated by the gas liquid separator. The results are shown in Table 1.

Example 3

Preparation of Hydrotreating Catalyst

A catalyst precursor was prepared in the same way as in Example 1. This catalyst precursor was charged into a heating furnace, heated to 300° C., then heated at a heating rate of 10° C./h between 300 and 400° C., and then calcined at 480° C. for 0.5 hour to obtain a hydrotreating catalyst. The content of the carbonaceous substance in the hydrotreating catalyst was 0.8% by mass in tetras of the carbon atom.
<Production of Hydrocarbon Oil>
Hydrotreating of the FT synthetic oil-derived middle distillate was performed in the same way as in Example 1 using the hydrotreating catalyst obtained above. A reaction temperature at which the $C_{18}$ isomer ratio became 85% was 339° C., and the yield of the gas oil fraction was 44% by mass. In addition, neither olefins nor oxygen-containing compounds were substantially contained in the liquid hydrocarbons separated by the gas liquid separator. The results are shown in Table 1.

Example 4

Preparation of Hydrotreating Catalyst

A kneaded mixture was prepared from silica zirconia, alumina, water, and starch in the same way as in Example 1, and this kneaded mixture was molded and dried to obtain a mold. This mold was calcined in air at 550° C. for 3 hours to obtain a catalyst support. As a result of measuring the content of a residue containing the starch-derived carbon atom contained in this catalyst support in the same way as in Example 1, the carbon atom was not detected (content in terms of the carbon atom was 0.02% by mass or less).

Dichlorotetraammine platinum (II) was supported by the catalyst support thus obtained in the same way as in Example 1 and dried to obtain a catalyst precursor. This catalyst precursor was calcined at 500° C. for 1 hour to temporarily obtain a catalyst (referred to as the "preliminary catalyst").

Next, this preliminary catalyst was dipped in the gas oil fraction obtained by hydrotreating a middle distillate obtained by fractionating a FT synthetic oil in Example 1. Then, the preliminary catalyst was taken out from the gas oil fraction, and a deoiling treatment was performed in a stream of nitrogen at 300° C. for 3 hours.

Next, the preliminary catalyst after the deoiling treatment was charged into a heating furnace, heated to 300° C. under an air atmosphere, then heated at a heating rate of 10° C./h between 300 and 400° C., and then calcined at 450° C. for 2 hours to obtain a hydrotreating catalyst. The content of the carbonaceous substance in this hydrotreating catalyst was 0.08% by mass in terms of the carbon atom.
<Production of Hydrocarbon Oil>
Hydrotreating of the FT synthetic oil-derived middle distillate was performed in the same way as in Example 1 using the hydrotreating catalyst obtained above. A reaction temperature at which the $C_{18}$ isomer ratio became 85% was 337° C., and the yield of the gas oil fraction was 44% by mass. In addition, neither olefins nor oxygen-containing compounds were substantially contained in the liquid hydrocarbons separated by the gas liquid separator. The results are shown in Table 2.

Example 5

Preparation of Hydrotreating Catalyst

A hydrotreating catalyst was obtained in the same way as in Example 4 except that the calcination time at 450° C. was set to 0.8 hour in the calcination of the preliminary catalyst dipped in the gas oil fraction and subjected to the deoiling treatment. The content of the carbonaceous substance in this hydrotreating catalyst was 0.4% by mass in terms of the carbon atom.
<Production of Hydrocarbon Oil>
Hydrotreating of the FT synthetic oil-derived middle distillate was performed in the same way as in Example 1 using the hydrotreating catalyst obtained above. A reaction temperature at which the $C_{18}$ isomer ratio became 85% was 339° C., and the yield of the gas oil fraction was 45% by mass. In addition, neither olefins nor oxygen-containing compounds were substantially contained in the liquid hydrocarbons separated by the gas liquid separator. The results are shown in Table 2.

Comparative Example 1

Preparation of Hydrotreating Catalyst

A catalyst precursor was prepared in the same way as in Example 1. This catalyst precursor was charged into a heating furnace, heated to 300° C. under an air atmosphere, then heated at a heating rate of 10° C./h between 300 and 400° C., and then calcined at 600° C. for 0.5 hour to obtain a hydrotreating catalyst. The content of the carbonaceous substance in this hydrotreating catalyst was 0.03% by mass in terms of the carbon atom.

<Production of Hydrocarbon Oil>

Hydrotreating of the FT synthetic oil-derived middle distillate was performed in the same way as in Example 1 using the hydrotreating catalyst obtained above. A reaction temperature at which the $C_{18}$ isomer ratio became 85% was 334° C., and the yield of the gas oil fraction was 41% by mass. In addition, neither olefins nor oxygen-containing compounds were substantially contained in the liquid hydrocarbons separated by the gas liquid separator. The results are shown in Table 1.

Comparative Example 2

Preparation of Hydrotreating Catalyst

A hydrotreating catalyst was obtained by operation similar to that in Example 4 except that the calcination of the preliminary catalyst dipped in the gas oil fraction and subjected to the deoiling treatment was performed at 470° C. for 2 hours after heating. The content of the carbonaceous substance in this hydrotreating catalyst was 0.03% by mass in terms of the carbon atom.

<Production of Hydrocarbon Oil>

Hydrotreating of the FT synthetic oil-derived middle distillate was performed in the same way as in Example 1 using the hydrotreating catalyst obtained above. A reaction temperature at which the $C_{18}$ isomer ratio became 85% was 334° C., and the yield of the gas oil fraction was 41% by mass. In addition, neither olefins nor oxygen-containing compounds were substantially contained in the liquid hydrocarbons separated by the gas liquid separator. The results are shown in Table 2.

Comparative Example 3

Preparation of Hydrotreating Catalyst

A hydrotreating catalyst was obtained by operation similar to that in Example 4 except that the calcination of the preliminary catalyst dipped in the gas oil fraction and subjected to the deoiling treatment was performed at 450° C. for 0.5 hour after heating. The content of the carbonaceous substance in this hydrotreating catalyst was 1.5% by mass in terms of the carbon atom.

<Production of Hydrocarbon Oil>

Hydrotreating of the FT synthetic oil-derived middle distillate was performed in the same way as in Example 1 using the hydrotreating catalyst obtained above. A reaction temperature at which the $C_{18}$ isomer ratio became 85% was 341° C., and the yield of the gas oil fraction was 43% by mass. In addition, neither olefins nor oxygen-containing compounds were substantially contained in the liquid hydrocarbons separated by the gas liquid separator. The results are shown in Table 2.

TABLE 1

|  | Example 1 | Example 2 | Example 3 | Comparative Example 1 |
|---|---|---|---|---|
| Catalyst precursor calcination temperature (° C.) | 500 | 500 | 480 | 600 |
| Catalyst precursor calcination time (h) | 1 | 0.5 | 0.5 | 0.5 |
| Carbonaceous substance content (% by mass) | 0.06 | 0.3 | 0.8 | 0.03 |

TABLE 1-continued

|  | Example 1 | Example 2 | Example 3 | Comparative Example 1 |
|---|---|---|---|---|
| Reaction temperature at which $C_{18}$ isomer ratio became 85% (° C.) | 336 | 338 | 339 | 334 |
| Yield of gas oil fraction (% by mass) | 43 | 44 | 44 | 41 |

TABLE 2

|  | Example 4 | Example 5 | Comparative Example 2 | Comparative Example 3 |
|---|---|---|---|---|
| Gas oil-dipped/deoiled preliminary catalyst calcination temperature (° C.) | 450 | 450 | 470 | 450 |
| Gas oil-dipped/deoiled preliminary catalyst calcination time (h) | 2 | 0.8 | 2 | 0.5 |
| Carbonaceous substance content (% by mass) | 0.08 | 0.4 | 0.03 | 1.5 |
| Reaction temperature at which $C_{18}$ isomer ratio became 85% (° C.) | 337 | 339 | 334 | 341 |
| Yield of gas oil fraction (% by mass) | 44 | 45 | 41 | 43 |

From the results of Table 1 and Table 2, it was revealed that according to the hydrotreating catalysts of Examples in which the content of the carbonaceous substance was 0.05 to 1% by mass, a high yield of the gas oil fraction compared with the hydrotreating catalysts in which the content of the carbonaceous substance was less than 0.05% by mass can be obtained at the same $C_{18}$ isomer ratio. In addition, in the hydrotreating catalyst in which the content of the carbonaceous substance was more than 1% by mass, a relatively high yield of the gas oil can be obtained at the same $C_{18}$ isomer ratio, but a reaction temperature for obtaining the same $C_{18}$ isomer ratio is high and thus becomes a problem in terms of the life of the catalyst.

INDUSTRIAL APPLICABILITY

According to the present invention, a hydrotreating catalyst that has a high hydro-isomerization activity and a suppressed cracking activity and is capable of obtaining a middle distillate excellent in cold flow property with a high yield, and a process for producing a hydrocarbon oil using the hydrotreating catalyst can be provided. A middle distillate rich in branched-chain aliphatic hydrocarbons and excellent in cold flow property with a high yield from a raw oil rich in straight-chain aliphatic hydrocarbons can thereby be obtained.

REFERENCE SIGNS LIST

20 . . . First fractionator, 30 . . . Naphtha fraction hydrotreating reactor, 32 . . . Middle distillate hydrotreating reactor, 34 . . . Wax fraction hydrocracking reactor, 60 . . . Second fractionator, 100 . . . Apparatus for producing a hydrocarbon oil.

The invention claimed is:

1. A process for producing a hydrocarbon oil, comprising:
   activating an unactivated hydrotreating catalyst, the unactivated hydrotreating catalyst comprising:

a catalyst support comprising an amorphous composite metal oxide having solid acidity, and at least one active metal supported by the catalyst support and selected from noble metals of Group 8 to Group 10 in the periodic table, wherein the unactivated hydrotreating catalyst contains a carbonaceous substance comprising a carbon atom, and the content of the carbonaceous substance in the unactivated hydrotreating catalyst is 0.05 to 1% by mass in terms of the carbon atom, and contacting a raw oil comprising 80% by mass or more of straight-chain aliphatic hydrocarbons with a boiling point of 25 to 360° C. and comprising 20% by mass or more of straight-chain aliphatic hydrocarbons with a boiling point of 150 to 360° C., with the activated hydrotreating catalyst in the presence of molecular hydrogen.

2. The process according to claim 1, wherein the raw oil is a synthetic oil obtained by a Fischer-Tropsch synthesis reaction.

3. A process for producing a hydrocarbon oil, comprising:
activating an unactivated hydrotreating catalyst, the unactivated hydrotreating catalyst comprising:

a catalyst support comprising an amorphous composite metal oxide having solid acidity, and at least one active metal supported by the catalyst support and selected from noble metals of Group 8 to Group 10 in the periodic table, wherein the amorphous composite metal oxide is at least one selected from silica zirconia, silica alumina, and alumina boria, wherein the unactivated hydrotreating catalyst contains a carbonaceous substance comprising a carbon atom, and the content of the carbonaceous substance in the unactivated hydrotreating catalyst is 0.05 to 1% by mass in terms of the carbon atom, and contacting a raw oil comprising 80% by mass or more of straight-chain aliphatic hydrocarbons with a boiling point of 25 to 360° C. and comprising 20% by mass or more of straight-chain aliphatic hydrocarbons with a boiling point of 150 to 360° C., with the activated hydrotreating catalyst in the presence of molecular hydrogen.

4. The process according to claim 3, wherein the raw oil is a synthetic oil obtained by a Fischer-Tropsch synthesis reaction.

5. A process for producing a hydrocarbon oil, comprising:
activating an unactivated hydrotreating catalyst, the unactivated hydrotreating catalyst comprising:

a catalyst support comprising an amorphous composite metal oxide having solid acidity, and platinum as an active metal supported by the catalyst support, wherein the unactivated hydrotreating catalyst contains a carbonaceous substance comprising a carbon atom, and the content of the carbonaceous substance in the unactivated hydrotreating catalyst is 0.05 to 1% by mass in terms of the carbon atom, and contacting a raw oil comprising 80% by mass or more of straight-chain aliphatic hydrocarbons with a boiling point of 25 to 360° C. and comprising 20% by mass or more of straight-chain aliphatic hydrocarbons with a boiling point of 150 to 360° C., with the activated hydrotreating catalyst in the presence of molecular hydrogen.

6. The process according to claim 5, wherein the raw oil is a synthetic oil obtained by a Fischer-Tropsch synthesis reaction.

7. A hydrotreating catalyst comprising a catalyst support comprising an amorphous composite metal oxide having solid acidity, and at least one active metal supported by the catalyst support and selected from noble metals of Group 8 to Group 10 in the periodic table, wherein the hydrotreating catalyst contains a carbonaceous substance comprising a carbon atom, and the content of the carbonaceous substance in the hydrotreating catalyst is 0.05 to 1% by mass in terms of the carbon atom, wherein a catalyst precursor of the hydrotreating catalyst is heated to a set calcination temperature, and from a temperature of about 250° C. to about 400° C., a rate of heating is from 1 to 50° C./h to prevent a rapid oxidation reaction from occurring.

8. The hydrotreating catalyst according to claim 7, wherein the content of the carbonaceous substance in the hydrotreating catalyst is 0.05 to 1% by mass in terms of the carbon atom.

* * * * *